United States Patent
Koshimizu et al.

[11] Patent Number: 6,002,811
[45] Date of Patent: Dec. 14, 1999

[54] IMAGE SCALING PROCESSING DEVICE AND IMAGE SCALING PROCESSING METHOD

[75] Inventors: Fumiko Koshimizu, Machida; Shinichi Sato; Yoshikazu Naito, both of Yokohama, all of Japan

[73] Assignee: Matsushita Graphic Communication Systems, Inc., Tokyo, Japan

[21] Appl. No.: 09/041,970

[22] Filed: Mar. 13, 1998

[30] Foreign Application Priority Data

Jul. 10, 1997 [JP] Japan .................................... 9-200815

[51] Int. Cl.⁶ .................................................. G06K 9/32
[52] U.S. Cl. .......................................... 382/298; 358/462
[58] Field of Search .................................. 382/298, 299, 382/176, 282; 358/462, 451

[56] References Cited

U.S. PATENT DOCUMENTS

| | | | |
|---|---|---|---|
| 5,274,474 | 12/1993 | Medina ..................................... | 358/462 |
| 5,337,167 | 8/1994 | Hiratsuka et al. ....................... | 358/462 |
| 5,369,507 | 11/1994 | Tanaka et al. ........................... | 358/462 |
| 5,832,141 | 11/1998 | Ishida et al. ............................. | 382/298 |

FOREIGN PATENT DOCUMENTS 6-164896  6/1994  Japan .
6-253140  9/1994  Japan .

OTHER PUBLICATIONS

Copy of an English Language Abstract, which was published on Jun. 10, 1994 of 6–164896.
Copy of an English Language Abstract, which was published on Sep. 9, 1994 of 6–253140.

*Primary Examiner*—Yon J. Couso
*Attorney, Agent, or Firm*—Greenblum & Bernstein, P.L.C.

[57] ABSTRACT

The image scaling processing device distinguishes whether an original image data is a character image or a half-tone image per a pixel unit in the image domain separating portion and scales each image in the character scaling processing portion and the half-tone scaling processing portion. In order to get a desired scale factor L times image data, the character scaling processing is performed by the first scaling processing for enlarging an image data by $2^n$ times (n is an integer, $L<2^n$) in each sub scanning direction and main scanning direction and by the second scaling processing for reducing by $L/2^n$ times the image data enlarged by $2^n$ times and the half-tone scaling processing is made by the first scaling processing for enlarging an image data by $2^n$ times (n is an integer, $L>2^n$) in each sub scanning direction and main scanning direction and by the second scaling processing for enlarging by $L/2^n$ times the image data enlarged by $2^n$ times.

11 Claims, 4 Drawing Sheets

IMAGE SCALING PROCESSING DEVICE AND IMAGE SCALING PROCESSING METHOD

BACKGROUND OF THE INVENTION

1. Field of the Invention

The present invention relates to an image scaling processing device and an image processing method of digital data such as facsimile, scanner, digital copy, or the like and more specially, to an image scaling processing device and an image processing method enlarging or reducing an image including half-tone shades at any scale factor.

2. Description of the Related Art

In the previously known image scaling processing device and the image processing method having enlargement and reduction function for this kind of a binary-valued image, a thinning processing is made at intervals corresponding to a reduction ratio at the time of reduction and, at the time of enlargement, after enlarging by integral times, the thinning processing is made at periodic times corresponding to a scale factor and thus enlargement and reduction processing is performed. The technology of this kind is described in Japanese Patent Application Laid-Open No. 164896/1994 and Japanese Patent Application Laid-Open No. 253140/1994.

However, according to a constitution of the above described art, the thinning processing is periodically made regardless of an input image data. For this reason, irregularity of a character outline part in a character portion of the input image becomes conspicuous and a noise is increased at half-tone data, thereby reproductivity is lost. Again, a lot of memory is required for keeping the data after the image processing is made as large as scale factor is enlarged.

The present invention is made in view of the above described subject and it is the object of the present invention to offer the image scaling processing device, wherein a binary-valued image can be given a enlarging and reducing processing at optional scale factor with the minimum scale of a circuit constitution and the character portion is smoothed when enlarged and a black line is kept when reduced. Further, a noise is not generated in the half-tone portion according to values of enlargement or reduction ratio, thereby reproductivity of gradation in the half-tone is maintained.

SUMMARY OF THE INVENTION

In order to achieve the above described object, the image scaling processing device is provided with an image domain separating portion for judging as to if an original image data of the present invention is a character image or a half-tone image per pixel unit, a enlargement establishing portion for establishing a scale factor, a character scaling processing portion for making a scaling processing of said image data at said scale factor, a half-tone scaling processing portion for making a scaling processing of said image data at said scale factor, and an image signal composing portion for composing an output of said character scaling processing portion and an output of said half tone scaling processing portion. Said image signal composing portion selects the output of said character scaling processing portion in the case that judgment result of said image domain separating portion is a character image and, while in the case that said judgment result is a half-tone image, composes an image by selecting the output of said middle tone scaling processing portion.

By this manner, a scaling processing with high gradation reproductivity can be made corresponding to a data by distinguishing between a character data and a half-tone data.

More concretely, in order that the image scaling processing device can get the desired scale factor L times image data, it may be better for a scaling processing of the character scaling processing portion to be made by the first scaling processing for enlarging an image data by $2^n$ times (n is an integer, $L<2^n$ each sub scanning direction and main scanning direction and by the second scaling processing for scaling the image data enlarged by $2^n$ time by $L/2^n$ times each sub scanning direction and main scanning direction.

Further, in order that the image scaling processing device can get the desired scale factor L times image data, it may be better for a scaling processing of the half-tone scaling processing portion to be made by the first scaling processing for enlarging an image data by $2^n$ times (n is an integer, $L>2^n$) each sub scanning direction and main scanning direction and by the second scaling processing for scaling the image data enlarged by $2^n$ times by $L/2^n$ times each sub scanning direction and main scanning direction.

DESCRIPTION OF THE PREFERRED EMBODIMENT

Embodiment 1

Figure 1:
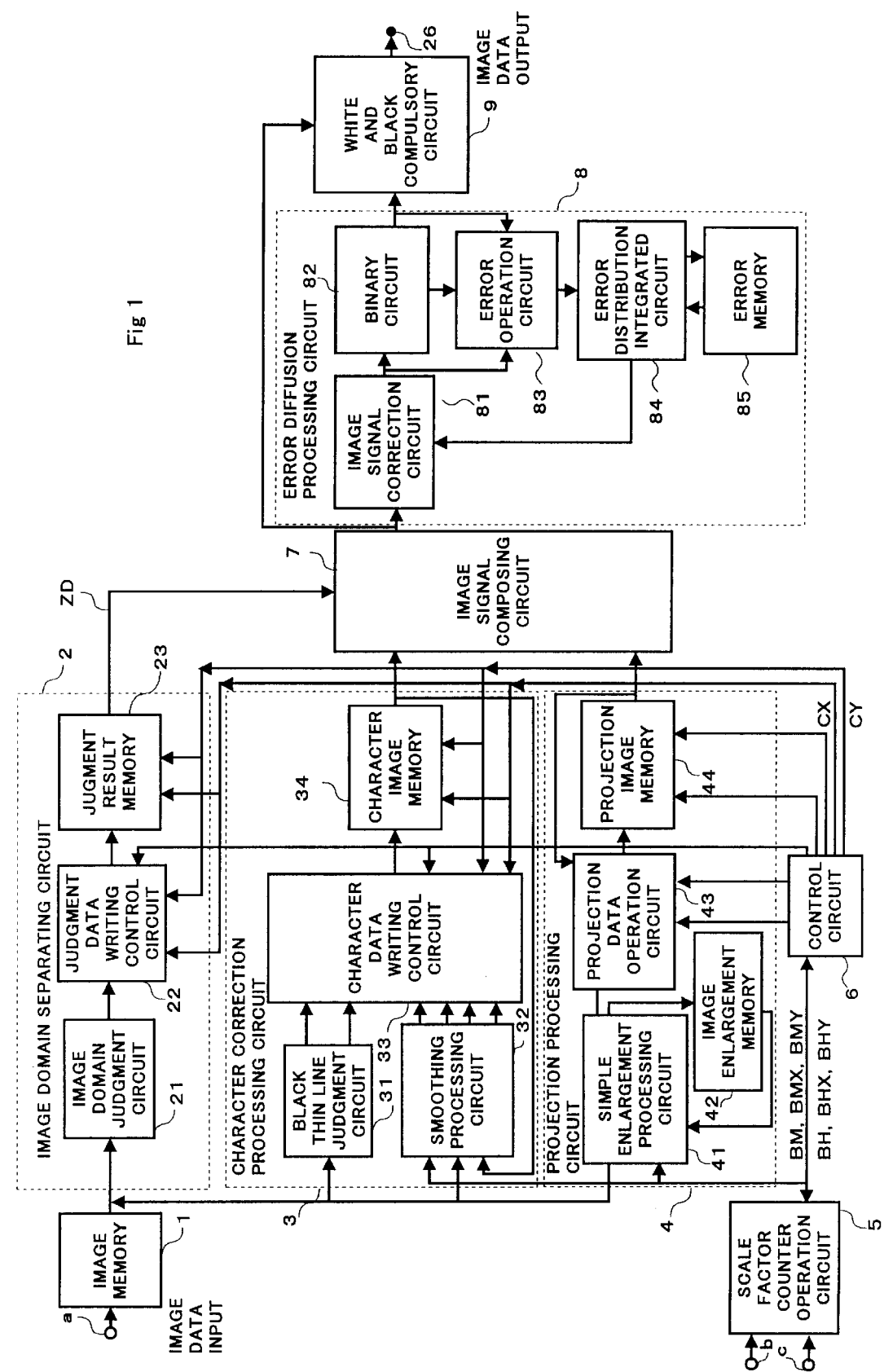
FIG. 1 is a block diagram, showing a constitution of the image scaling processing device according to a first embodiment of the present invention.

FIG. 1 is a block diagram, showing an outline of the image scaling processing device according to a first embodiment of the present invention. The device comprises image memory 1, image domain separating circuit 2, character correction processing circuit 3, projection processing circuit 4, scale factor counter operation circuit 5, control circuit 6, image signal composing circuit 7, error diffusion processing circuit 8 and white and black compulsory reorganizing circuit 9.

Image memory 1 is a memory for memorizing in plural lines a binary-valued image input from terminal a.

Image domain separating circuit 2 is a circuit which refers to a fixed domain of a signal of m×n pixel read out from image memory 1 for judgment by each pixel as to if the observed pixel is half-tone or character and outputs an image domain judgment result according to an image processing timing, and which comprises image domain judging circuit 21 for judging by the number of black and white variation point as to if the observed pixel is half-tone or character, judgment data writing control circuit 22 for controlling judgment result writing by an address instruction from control circuit 6 to be described later on and judgment result memory 23 for memorizing judgment result.

Character correction processing circuit 3 is a circuit which reads out a signal of m×n pixel from image memory 1, makes a smoothing processing by a pattern matching using reference patterns at the time of enlargement, makes a maintenance processing of a black thin line at the time of reduction and outputs these character correction judgment result data, synchronizing with projection processing circuit 4 to be described later on, and which comprises black thin line judging circuit 31, smoothing processing circuit 32 which executes 2 times-enlarging processing by using smoothing interpolation data generated by means of a pattern matching with the fixed domain of m×n pixel prescribed reference patterns. Character data writing control circuit 33 for controlling necessity or non-necessity of writing of the smoothing interpolation data and the writing location by both judgment result of black thin line judging circuit 31 and the character address of control circuit 6 and character image memory 34 for memorizing the character data output from the character writing control circuit 33.

Smoothing processing circuit 32 re-inputs an output image data of character image memory 34 in the case that scale factor is set at scale factor counter operation circuit 5 (BM≠0) and repeats the same action according to the number of setting times. At this time, the first black thin line judgment data is kept in character data writing control circuit 33 and the date is used for the final scaling processing.

In this connection, scale factor counter operation circuit 5 inputs a main scanning scale factor from terminal b and, by inputting a sub scanning scale factor from terminal c, makes a scale factor operation for computing the number of times (BM, BH) for making 2 times enlargement toward each main and sub scanning directions and scale factors (BMX, BMY, BHX, BHY) of the fractions.

Projection processing circuit 4 is a circuit which outputs a projection data for an output pixel of the observed pixel by a fixed scale factor and which comprises simple enlargement processing circuit 41 for executing 2 times-enlarging processing toward each main and sub scanning directions by generating interpolation data of two lines two rows four pixels using the same data with the observed pixel, image enlargement memory 42 for memorizing the output data of this simple enlargement processing circuit 41, projection data operation circuit 43 for computing a multi-valued projection data from domain ratio of a black pixel projected by obtaining an integrated value of the projection value if there exists a plurality of corresponding observed pixels by obtaining a projection data from the observed pixels and the projection coefficient to be described later on and projection image memory 44 for housing the output data of this projection data operation circuit 43.

Projection data operation circuit 43 has a constitution, wherein the output data of image enlargement memory 44 is re-input into simple enlargement circuit 41 in the case that scale factor is set in scale factor counter operation circuit 5 (BH≠0) and 2 times enlargement can be made once again and further, in the case that counter value BH of scale factor counter operation circuit 5 becomes 0, a projection processing where, in projection data operation circuit 43, the output data of simple enlargement processing circuit 41 complies with projection coefficient from control circuit 6 is made.

However, the enlargement processing can also be made by substituting projection image memory 44 for image enlargement memory 42. That is to say, a constitution is possible wherein the output data of simple enlargement processing circuit 41 is input to projection data operation circuit 43 and, if said counter value BM is 0 in projection data operation circuit 43, an operation is made by using a projection coefficient from the control circuit and, if BM≠0, an input image signal is output to projection image memory 44 without making a projection operation and re-input to simple enlargement processing circuit 41.

Control circuit 6 computes and outputs to projection data operation circuit 43 the projection coefficient for computing a projection domain for an output pixel of the input pixel by inputting enlargement data BH output from scale factor counter operation circuit 5, and generates projection address AX, AY for projection image memory 44 and character address CX,CY for judgment result memory 23, character data wiring control circuit 33 and character image memory 34.

Image signal composing circuit 7 is a circuit for composing a multi-valued image data by an image domain judgment result data output of image domain separating circuit 2, a character image processing result data output of character correction processing circuit 3 and a projection image data output of projection processing circuit 4. In the case that an image domain judgment result is a character and a character correction processing output data is black, the minimum value 0 of a composing multi-valued output level is output. In the case that the image domain judgment result is a character and the character correction processing output data is white, the maximum value (255 in case of 256 gradation) of the composing multi-valued output level is output. And in the case that the image domain judgment result is half-tone, the projection image data is output.

Error diffusion processing circuit 8 is a logic circuit which makes an error diffusion processing of the multi-valued image data output composed by image signal composing circuit 7 and outputs a binary-valued image data, and which comprises image signal correction circuit 81 for correcting an input image signal by an error data of the past, a binary circuit 82 for making the correction result into a binary valued result, an error operation circuit 83 for obtaining an error from the binary-valued result and said correction result, an error distributing integrated circuit 84 for distributing the error data to the processing pixels to be followed and for obtaining an error data of the presently processing pixel and an error memory 85 for memorizing the error data. A character data becomes the maximum or the minimum value based on the output result of image signal composing circuit 7 and therefore, the character data is arranged so as not to be affected by the error diffusion processing, even if passed through the error diffusion processing circuit.

White and black compulsory circuit 9 is a circuit, wherein the output of a binary circuit 82 is compulsorily made black in the case that a level of an error diffusion input is at the minimum level and, in the case of the maximum level, made white and, in other cases, the output of binary circuit 82 is output as it is. By this processing, a character information definitely becomes white or black and reversal of white and black which occurs at rare occasions by propagation of errors by error diffusion processing is arranged so as not to occur at the character portion.

Figure 2:
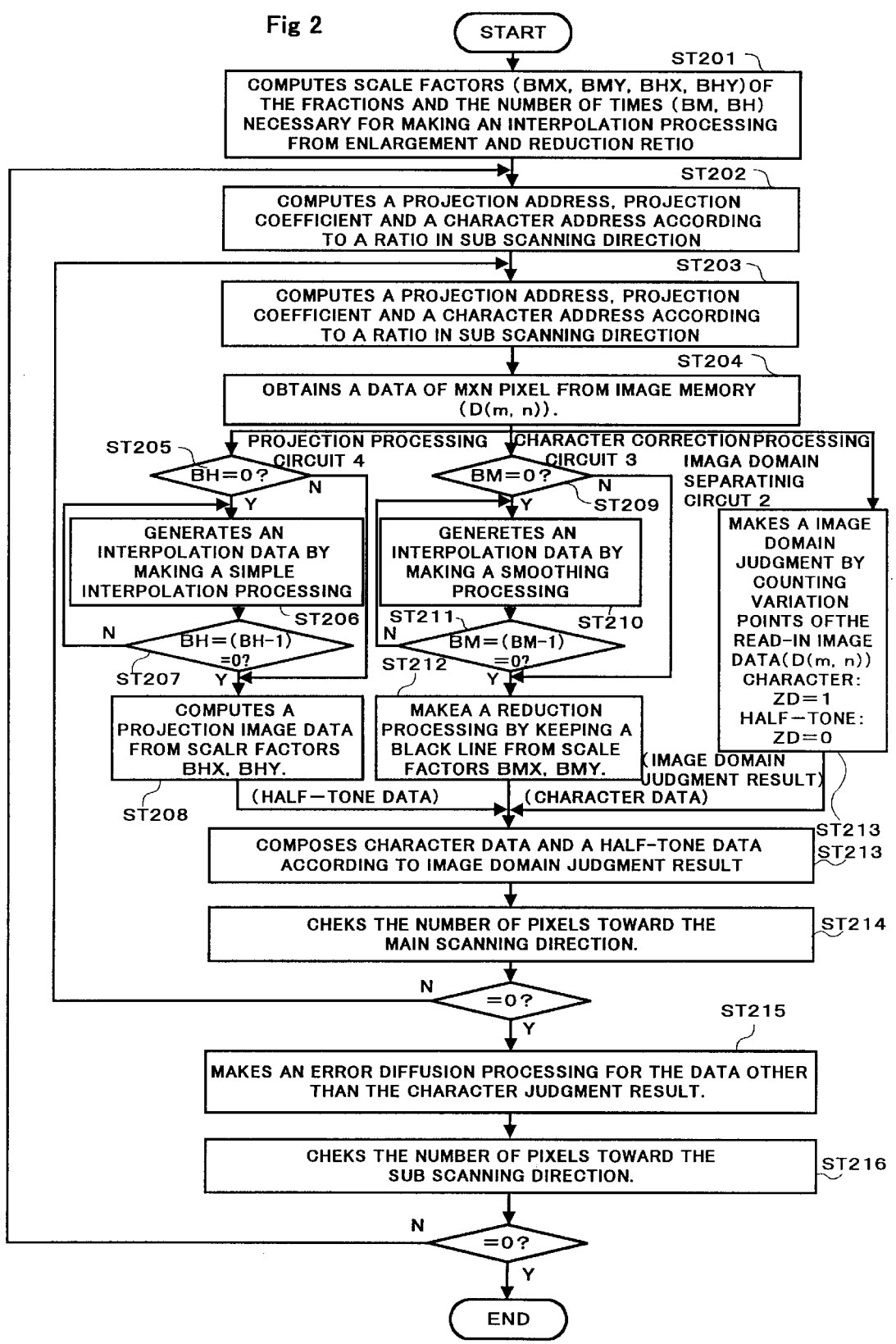
FIG. 2 is a flow chart of the image scaling processing device according to a first embodiment.

An action of the image processing device as constituted above will be described more in details with reference to an action flow chart. FIG. 2 is an action flow chart according to a first embodiment, describing as an example the processing where a main scanning scale factor is treated as MX and a sub scanning scale factor is treated as MY.

First, scale factor counter operation circuit 5 computes the number of 2 times enlargement by an interpolation processing on the basis of a fixed main scanning scale factor MX and a fixed sub scanning scale factor MY (ST201). At this time, the number of times for a smoothing processing is treated as BM, scale factors of the fractions as BMX, BMY, the number of times for making a simple enlargement as BH and scale factors of the fractions as BHX, BHY. In case of the smoothing processing, the number of times BM for making the smooth processing is fixed so that the scale factor becomes once more than desired and, after that, a reduction processing is made by thinning out a fixed bit. By this manner, scale factors BMX, BMY of the fractions are fixed so that a data of the desired enlargement can be obtained (scale factors of the fractions are less than 1.0). While, in case of a projection processing, the number of times BH for making the simple enlargement processing so that enlargement does not exceed more than desired is fixed and, by scaling the data after the simple enlargement processing, scale factors of the fractions BHX, BHY are fixed so that a data of the desired enlargement can be obtained (scale factors of the fractions are more than 1.0)

For example, in case of 2 times enlargement, since the smoothing processing is $2.0=2^1 \times 1.0$, BM=1, BMX=BMY=1.0. While since the projection processing is $2.0=2^0 \times 2.0$, BH=0, BHX=BHY=2.0. Again, in case of 3 times enlargement, since the smoothing processing is $3.0=2^2 \times 0.75$, BM=2, BMX=BMY=0.75. Also, since $3.0=2^1 \times 1.5$, BH=1, BHX=BHY=1.5.

Similarly, in case of 4 times enlargement, since the smoothing processing is $4.0=2^2 \times 1.0$, BM=2, BMX=BMY=1.0. While, since the projection processing is $4.0=2^1 \times 2.0$, BH=1, BHX=BHY=2.0. Again, in case of five times enlargement, $5.0=2^3 \times 5/8$, BM=3, BMX=BMY=0.625 and since the projection processing is $5.0=2^2 \times 1.25$, BH=2, BHX=BHY=1.25.

Next, projection address AY of the sub scanning direction, projection coefficient KY and character address CY are generated by control circuit 6 (ST202). Acquisition of the address of an projection method uses the publicly known technique for computing projection address AY and projection coefficient KY from scale factors BHX, BHY and character address CY from scale factors BMX, BMY.

Next, projection address AX of the main scanning direction, projection coefficient KX and character address CX are generated in control circuit 6 (ST203). In this case too, the publicly known technique for computing projection address AX and projection coefficient KX from scale factors BHX, BHY and character address CX from scale factors BMX, BMY is used.

Next, image domain separating circuit 2, character correction processing circuit 3 and projection processing circuit 4 read in an image data of m lines n rows necessary for the image processing from the image memory 1 (ST204). From here, the flow branches off according to details of each processing.

First, projection processing circuit 4 inputting the image data from image memory 1 judges as to if the simple enlargement processing is to be made on the basis of data BH input from scale factor counter operation circuit 5 (ST205). If BH=0 in comparison with the binary-valued image input from image memory 1, the simple enlargement processing is not made, but if BH=more than 1, the simple enlargement processing is made for said number of times. The output image data from simple enlargement processing circuit 41 is memorized in image enlargement memory 42 if BH=(BH−1) is not 0 and, by reading out the image data from the image enlargement memory 42 and re-inputting it to simple enlargement circuit 41, a simple 2 times enlargement is made (ST206) and the simple 2 times enlargement is repeated until BH=(BH−1)=0 (ST207).

If BH=(BH−1)=0, the data after the enlargement processing is output to projection data operation circuit 43 and the projection processing is made (ST208). This projection processing is made to obtain a projection domain by using projection coefficient KX, KY from control circuit 6 and forms the multi-valued pixel by domain ratio occupied by the black domain of the projection domain in a projection output pixel. One output pixel receives projection from the maximum four input pixels in the case that the enlargement processing is made and receives projection from the maximum nine input pixels in the case that reduction processing is made. Thus, the projection domain is computed by one each pixel and input to projection image memory 44. In the case that a processing is made for an address of the same projection image memory, the address is read out again and an action of adding it to the next projection domain is repeated.

Character correction processing circuit 3 inputting the image data from image memory 1 judges as to if a smoothing interpolation processing is to be made on the basis of input data BM from scale factor counter operation circuit 5 (ST209). If BM=0, the smoothing interpolation processing is not made for a binary image input from image memory 1 and, if BM=more than 1, the interpolation processing is made for said number of times (ST210) In smoothing processing circuit 32, an interpolation data of the desired pixel is generated by the pattern matching with the pattern fixed in advance by referring to an image data of m lines n rows read out from image memory 1.

If BM=more than 1, the output data of smoothing processing circuit 32 is memorized in character image memory 34 as it is, passing through character data writing control circuit 33 and re-input to smoothing processing circuit 32. (ST211) If BM=0, the enlargement processing is not made, but the reduction processing is made (ST212). At this time, judgment is made on the basis of the pattern matching as to if the observed pixel of the previous time agrees with a thin line pattern toward each main and sub scanning directions by referring to an image data of m lines n rows and, as a result, if agreed, a character nucleus data writing of this time is prohibited. Also, in the case that the address of the interpolation data from character address CX, CY overlaps with the address of the already written character nucleus data, an overwriting is prohibited. The output data making these processing is memorized in character image memory 34.

Next, image domain separating circuit 2 counts variation points of the image data of m×n pixel and if the variation points are more than a fixed value, judgment is made on it as ZD=0 (half-tone) and, if less than the fixed value, judgment is made on it as ZD=1(character) and the result is memorized in judgment result memory 23.

The image data completing the above three processing is composed according to the image domain judgment result. In the case that the image domain judgment result is half-tone (ZD=0), the output image data of projection processing circuit 4, and in the case that the image domain judgment result is a character (ZD=1), the output image data of character correction processing circuit 3 are both selected and composed (ST213).

A series of these processing are made by each pixel and, after the processing is made for the pixel of main scanning direction (ST214), the image data is composed by image signal composing circuit 7 and the composed multi-valued data undergoes error diffusion and binary treatment by error diffusion processing circuit 8 (ST215). The processing is moved to the next line and the same processing is made. Thus the above action is repeated, thereby making the image processing for one page (ST216).

By this manner, a scaling processing of a character data can be made in the minimum possible scope of a circuit at high speed with optional scale factor by combining a first scaling processing that is an enlargement processing and a second scaling processing that is an reduction processing. While, the scaling processing of a half-tone data can be made in the minimum possible scope of a circuit at high speed with optional scale factor and high gradation reproductivity by combining the simple enlargement processing corresponding to the first scaling processing and the scaling processing by a projection method corresponding to the second scaling processing.

Embodiment 2

Figure 3:
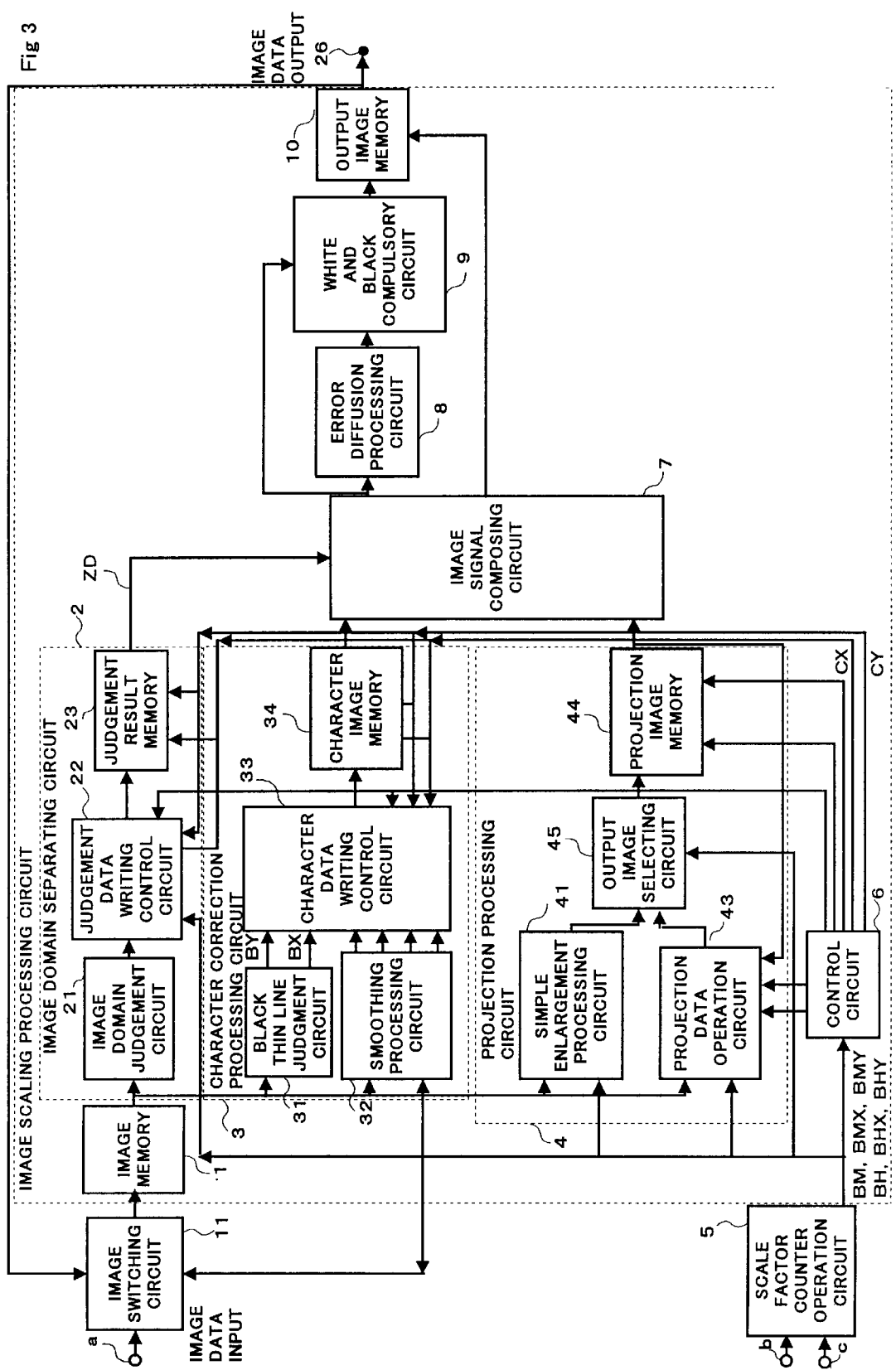
FIG. 3 is a block diagram, showing a constitution of the image scaling processing device according to a second embodiment of the present invention; and, FIG. 4 is a flow chart of the image scaling processing device according to a second embodiment.

Next, FIG. 3 is a block diagram, showing the outline of the image scaling processing device according to a second embodiment of the present invention. A basic circuit constitution is the same with a first embodiment. However, though in the first embodiment, the constitution is such that the image data is fed back plural times inside character correction processing circuit 3 and projection processing circuit 4, in the second embodiment, the constitution is such that the smoothing processing and the projection processing are made by feeding back plural times the output signal of the whole of the image processing device. For this reason, the second embodiment has a constitution comprising output image memory 10, image switching circuit 11 and output image selecting circuit 45.

Output image memory 10 is the output image memory for memorizing a scaling processing result and, in the case that more that 2.0 times enlargement is made, the output data is input to image switching circuit 11. Image switching circuit 11 is a circuit for switching as to if an input image data is treated as a binary original image data from terminal a or if treated as an image data from the output image memory to be described later on after 2.0 times enlargement is made. Also, output image selecting circuit 45 for selecting outputting either simple enlargement processing circuit 41 or projection data operation circuit 43 by a scale factor is installed inside projection processing circuit 4 and a feed back signal from output image memory 10 is arranged to reflect on the projection processing.

Figure 4:
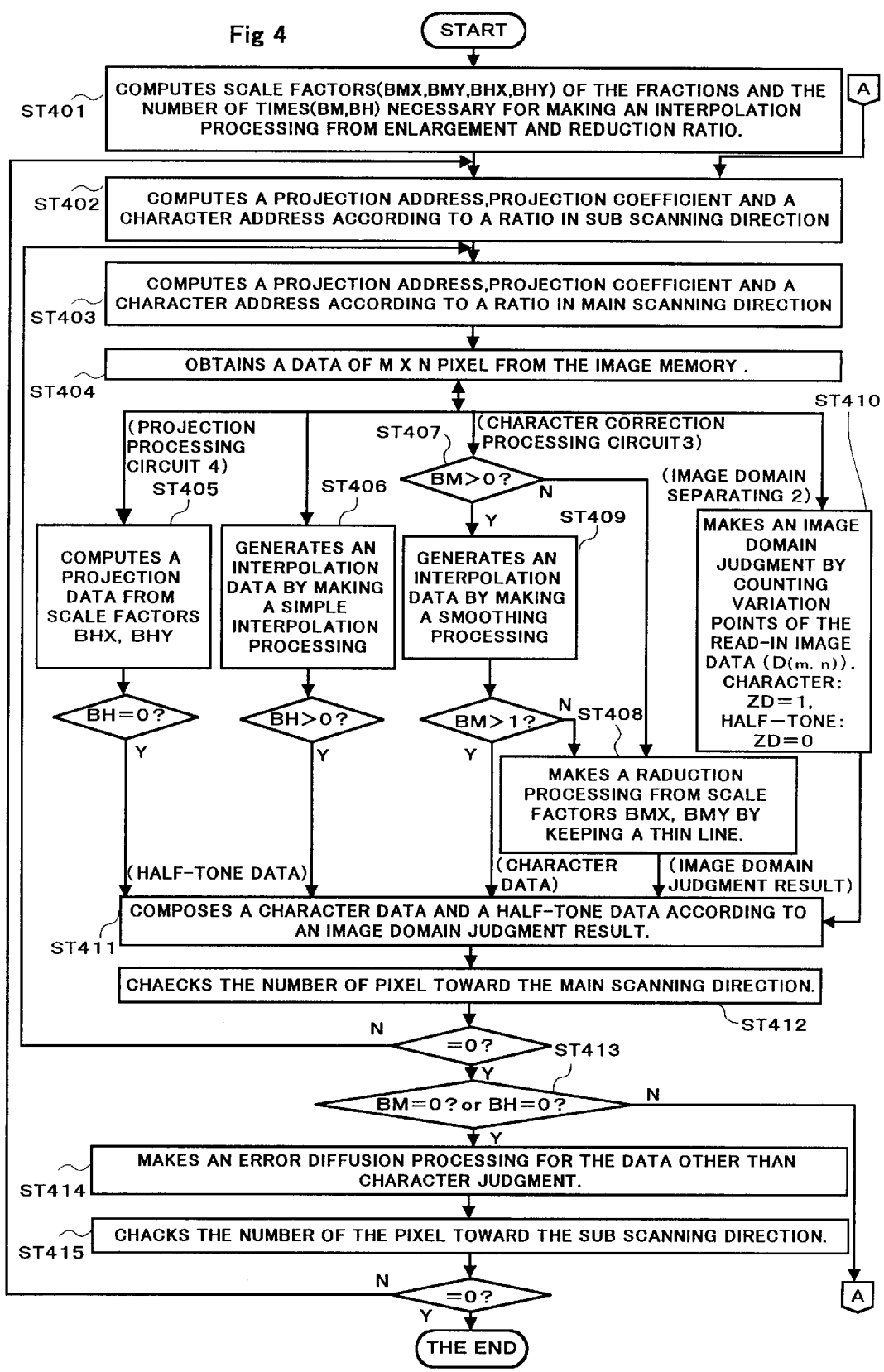

The action of the image processing device as constituted as above will be described with reference to an action flow chart of FIG. 4.

First, the number of times for 2.0 times enlargement by the interpolation processing is computed from a fixed main scanning scale factor MX and sub scanning scale factor MY (ST401). The number of times for the smoothing processing is treated as BM and the scale factors of the fractions as BMX, BMY and the number of times for the simple enlargement is treated as BH and the scale factors of the fractions as BHX, BHY. Fixation of these scale factors are the same with the first embodiment.

Next, projection address AY of the sub scanning direction, projection coefficient KY and character address CY are generated in control circuit 6 (ST402). Acquisition of an address of the projection method uses the publicly known technology which computes projection address AY and projection coefficient KY from scale factors BHX, BHY and character address CY from scale factors BMX, BMY.

Next, projection address AX of the main scanning direction, projection coefficient KX and character address CX are generated in control circuit 6 (ST403). In this case too, the publicly known technology for computing projection address AX and projection coefficient KX from scale factors BHX, BHY and character address CX from scale factors BMX, BMY is used.

Next, image domain separating circuit 2, character correction processing circuit 3 and projection processing circuit 4 read in the image data of m lines n rows necessary for the image processing from image memory 1 (ST404). From here, the flow breaks off according to details of each processing.

First, projection processing circuit 4 inputting the image data from image memory 1 puts both simple enlargement processing circuit 41 and projection data operation circuit 43 into function in parallel and, on the basis of data BH input from scale factor counter operation circuit 5, judges as to which data is to be selected and, if BH=0, selects the output data of projection data operation circuit 43 and, if BH=more than 1, selects the output data of simple enlargement processing circuit 41 (ST405, ST406). In case of BH=0, in projection data operation circuit 43, a projection domain is obtained by using projection coefficient KX, KY from control circuit 6 and a multi-valued pixel is formed by an domain ratio occupied by the black domain of the projection domain in a projection output pixel. One output pixel receives the maximum four projections from an input pixel in the case that enlargement processing is made and receives the maximum nine projections from the input pixel in the case that reduction processing is made. Thus, the projection domain is computed by one each pixel and input to projection image memory 44. In the case that a processing is made for an address of the same projection image memory, the address is read out again and an action for adding an domain of the next projection is repeated.

Next, character correction processing circuit 3 inputting the image data from image memory 1 judges as to if the smoothing interpolation processing is to be made on the basis of data BM input from scale factor counter operation circuit 5 (ST407) and, if BM=0 for the input image, does not make the smoothing interpolation processing but makes a reduction processing (ST408) and, if BM=more than 1, makes the enlargement processing by the smoothing interpolation processing (ST409). In smoothing processing circuit 32, an interpolation data of the observed pixel is generated by the pattern matching with the pattern already fixed by referring to the image data of m line n row read out from image memory 1.

Also, in black thin line judgment circuit 31, judgment is made as to if the observed pixel of the prevcious time agrees with patterns on the basis of the pattern matching from the image data of m×n pixel for each of the main and the sub scanning directions and the result is delivered to character data writing control circuit 33.

In character data writing control circuit 33, a writing to character image memory 34 is controlled according to judgment as to if more than 2.0 times enlargement is to be made and by referring to an output of black thin line judgment circuit 31 as the occasion may demand.

More concretely, in the case that more than 2.0 times enlargement processing is made (BM=more than 1), character data writing control circuit 33 does not refer to the output of black thin line judgment circuit 31, but outputs an output data of smoothing processing circuit 32 as it is to character image memory 34.

Also, in the case that less than 2.0 times enlargement processing is made (BM=0), character data writing control circuit 33 refers to the output of black thin line judgment circuit 31 and prohibits a writing to the appropriate character address of a processing data of the observed image. By such processing, a black thin line is not harmed but reflected in a scaling data.

While, in the case that a writing address of the interpolation data by the smoothing processing overlaps with the character address already written, an overwriting is prohibited and its result is memorized in image memory 34. By such processing, the black thin line is not harmed when a pixel is thinned out.

Next, image domain separating circuit 2 inputting the image data of m×n pixel from image memory 1 counts variation point of the image data read in and, if the variation point is more than a fixed value, judges it as half tone ZD=0 and, if the variation point is less than the fixed value, judges it as character ZD=1 and its result is memorized in judgment result memory 23 (ST410). In case of more than 2.0 times enlargement, 2.0 times data is re-input and re-processed, but in order to increase judgment accuracy, even in this case, the result of the first time processing is maintained till the end of the last processing and output to image signal composing circuit 7.

After the above three processing end, an image data is composed according to the image domain judgment result (ST411). In the case that the image domain judgment result is half-tone ZD=0, an output image data of projection processing circuit 4, and in the case that the image domain judgment result is ZD=1, the output image data of character correction processing circuit 3, are both selected and composed.

A series of these processing are made by each one pixel and, after a processing is made for the number of the pixels of the main scanning direction (ST412), the output data of image signal composing circuit 7 while on the way to more than 2.0 times enlargement processing is housed in output image memory 10 and re-input in image switching circuit 11. Thus, the scaling processing is repeated according to a fixed scale factor (ST413) When the last scaling processing ends, the composed multi-valued data which is the output of image signal composing circuit 7 undergoes a binary treatment by error diffusion in error diffusion processing circuit 8 (ST414) and memorized in output image memory 10 and output outside. The processing for the above one line is repeated until the processing for one page ends, thereby the scaling processing ends. (ST415)

As quite clear from the above description, according to the present invention, a binary image can be processed for enlargement and reduction at an optional scale factor with the minimum scope of a circuit constitution. Also, a scaling processing with high gradation reproductivity can be made according to details of a data by distinguishing between a character data and a half-tone data.

What is claimed is:

1. An image scaling processing device, comprising:
   an image domain separator that determines whether original image data comprises one of a character image and a half-tone image per pixel;
   a scale factor setting device that sets a scale factor;
   a character scaling processor that performs a scaling operation on said image data with said scale factor;
   a half-tone scaling processor that performs a scaling operation on said image data with said scale factor; and
   an image signal composer that selects an output of said character scaling processor and an output of said half-tone scaling processor, said image signal composer selecting said output of said character scaling processor when said image domain separator determines that said original image data comprises a character image, said image signal composer selecting said output of said half-tone scaling processor when said image domain separator determines that said original image data comprises a half-tone image, wherein, in order to obtain a desired scale factor L times image data, said scaling operation of one of said character scaling processor and said half-tone scaling processor is performed by at least one of:
   (1) enlarging an image data by $2^n$ times in each of a subscanning direction and a main scanning direction, and reducing by $L/2^n$ times said image data enlarged by $2^n$ times, where n is an integer, $L<2^2$, and
   (2) enlarging an image data by $2^n$ times in each of a subscanning direction and a main scanning direction, and enlarging by $L/2^n$ times said image data enlarged by $2^n$ times, where n is an integer, $L>2^2$.

2. The image scaling processing device according to claim 1, wherein the scaling processing of both said character scaling processor and said half-tone scaling processor repeats scaling plural times by a scaler in accordance with a fixed scale factor and the scaling processing of both processors is performed by increasing or decreasing bits by computing processing.

3. The image scaling processing device according to claim 2, comprising an image signal composing circuit for composing both an image data after the scaling processing is performed by said character scaling processor and an image data after the scaling processing is performed by said half-tone scaling processor.

4. The image scaling processing device according to claim 2, wherein the scaling processing of both said character scaling processor and said half-tone scaling processor is performed by feeding back to each of said character scaling processor and said half-tone scaling processor the composed image data after an image data output of said character scaling processor and an image data output of said half-tone scaling processor are composed.

5. The image scaling processing device according to claim 2, wherein the scaling processing is performed on the basis of count value of a counter set the number n of cycle given by the given scale factor L of the scaler.

6. The image scaling processing device according to claim 2, which is arranged not to take a black thin line of an original image data memorized in advance as a subset of thinning out or reduction processing on the scaling processing of said character scaling processor.

7. The image scaling processing device according to claim 2, wherein the scaling processing is performed on the basis of a count value of a counter set with the number n of cycles given by the scale factor L of the scaler.

8. The image scaling processing device according to claim 4, wherein the scaling processing is performed on the basis of a count value of a counter set with the number n of cycles given by the scale factor L of the scaler.

9. The image scaling processing device according to claim 2, which is arranged not to take a black thin line of an original image data memorized in advance as a subset of thinning out or reduction processing on the scaling processing of said character scaling processor.

10. The image scaling processing device according to claim 4, which is arranged not to take a black thin line of an original image data memorized in advance as a subset of thinning out or reduction processing on the scaling processing of said character scaling processor.

11. An image scaling processing method, wherein an original image data is determined, by an image domain separator per a pixel unit, whether the pixel unit is a character image or a half-tone image, and the image data is scale processed with a given scale factor by a character scaling processor and/or a half-tone scaling processor, the output of the character scaling processor is selected by both a signal composer when the image domain separator determines that the original image data is a character image, and when the image domain separator determines that the original image data is a half-tone image, the output of the half-tone scaling processor is selected and at the same time the scaling processing is performed by composing the output of the character scaling processor and the output of the half-tone scaling processor wherein, in order to obtain a desired scale factor L times image data, the scaling operation of one of the character scaling processor and the half-tone scaling processor is performed by at least one of:

(1) enlarging an image data by $2^n$ times in each of a subscanning direction and a main scanning direction, and by reducing by $L/2^n$ times the image data enlarged by $2^n$ times, where n is an integer, $L is < 2^n$, and (2) enlarging an image data by $2^n$ times in each of a subscanning direction and a main scanning direction, and enlarging by $L/2^n$ times the image data enlarged by $2^n$ times, where n is an integer, $L > 2^n$.

* * * * *

UNITED STATES PATENT AND TRADEMARK OFFICE
CERTIFICATE OF CORRECTION

PATENT NO. : 6,002,811
DATED : December 14, 1999
INVENTOR(S) : F. KOSHIMIZU

It is certified that error appears in the above-identified patent and that said Letters Patent is hereby corrected as shown below:

At column 10, line 10 (claim 1, line 27) of the printed patent, "$L<2^a$" should be —$L<2^n$—.

At column 10, line 14 (claim 1, line 31) of the printed patent, "$L>2^a$" should be —$L>2^n$—.

Signed and Sealed this

Twenty-seventh Day of March, 2001

Attest:

NICHOLAS P. GODICI

Attesting Officer     *Acting Director of the United States Patent and Trademark Office*